United States Patent [19]

Laverty

[11] 3,861,269

[45] *Jan. 21, 1975

[54] FASTENER WITH IMPROVED THREAD CONSTRUCTION

[75] Inventor: Richard C. Laverty, West Chester, Pa.

[73] Assignee: Superior Dry Wall Screw Mfg., Co., Inc., Elk Grove Village, Ill.

[*] Notice: The portion of the term of this patent subsequent to Dec. 28, 1989, has been disclaimed.

[22] Filed: Nov. 13, 1972

[21] Appl. No.: 306,101

Related U.S. Application Data

[63] Continuation-in-part of Ser. No. 103,637, Jan. 4, 1971, Pat. No. 3,703,843.

[52] U.S. Cl. .................................................. 85/46
[51] Int. Cl. ........................ F16b 25/00, F16b 39/30
[58] Field of Search ........ 85/46, 41, 48, 47; 151/22; 10/10 R; 52/700, 362, 363

[56] References Cited
UNITED STATES PATENTS

| | | | |
|---|---|---|---|
| 65,651 | 6/1867 | Davies | 85/46 X |
| 408,531 | 8/1889 | Rogers | 85/46 |
| 438,754 | 10/1890 | Rogers | 85/46 |
| 1,980,093 | 11/1934 | Rosenberg | 85/46 |
| 2,419,555 | 4/1947 | Fator | 85/46 |
| 3,109,691 | 11/1963 | Burkhardt | 85/46 X |
| 3,207,023 | 9/1965 | Knohl | 85/46 |
| 3,233,500 | 2/1966 | De Vellier | 85/46 |
| 3,426,642 | 2/1969 | Phipard | 85/46 |
| 3,703,843 | 11/1972 | Laverty | 85/46 |
| R3,941 | 4/1870 | Pierce | 85/46 |

Primary Examiner—Ramon S. Britts
Attorney, Agent, or Firm—Irvin A. Lavine

[57] ABSTRACT

A fastener having a shank divided into first and second portions, with a continuous thread on both portions extending from end to end of the shank and plural convolutions on both portions; an additional thread extends only on the second portion intermediate the continuous thread, of similar uniform pitch as the continuous thread, and parallel to it; the second portion may be adjacent the head or intermediate the ends of the shank. The thread major diameters may be uniform, the major diameter on the second portion may be less than the major diameter on the first portion, the major diameter may be uniform except for the leading portion of the additional thread, or the additional thread may have a smaller major diameter than the continuous thread. The additional thread may be spaced unevenly relative to the continuous thread along the shank. The shank terminates in a head and a pointed or blunt end, and the minor diameter of both portions may be the same or that of the second portion may be larger than that of the first portion.

17 Claims, 11 Drawing Figures

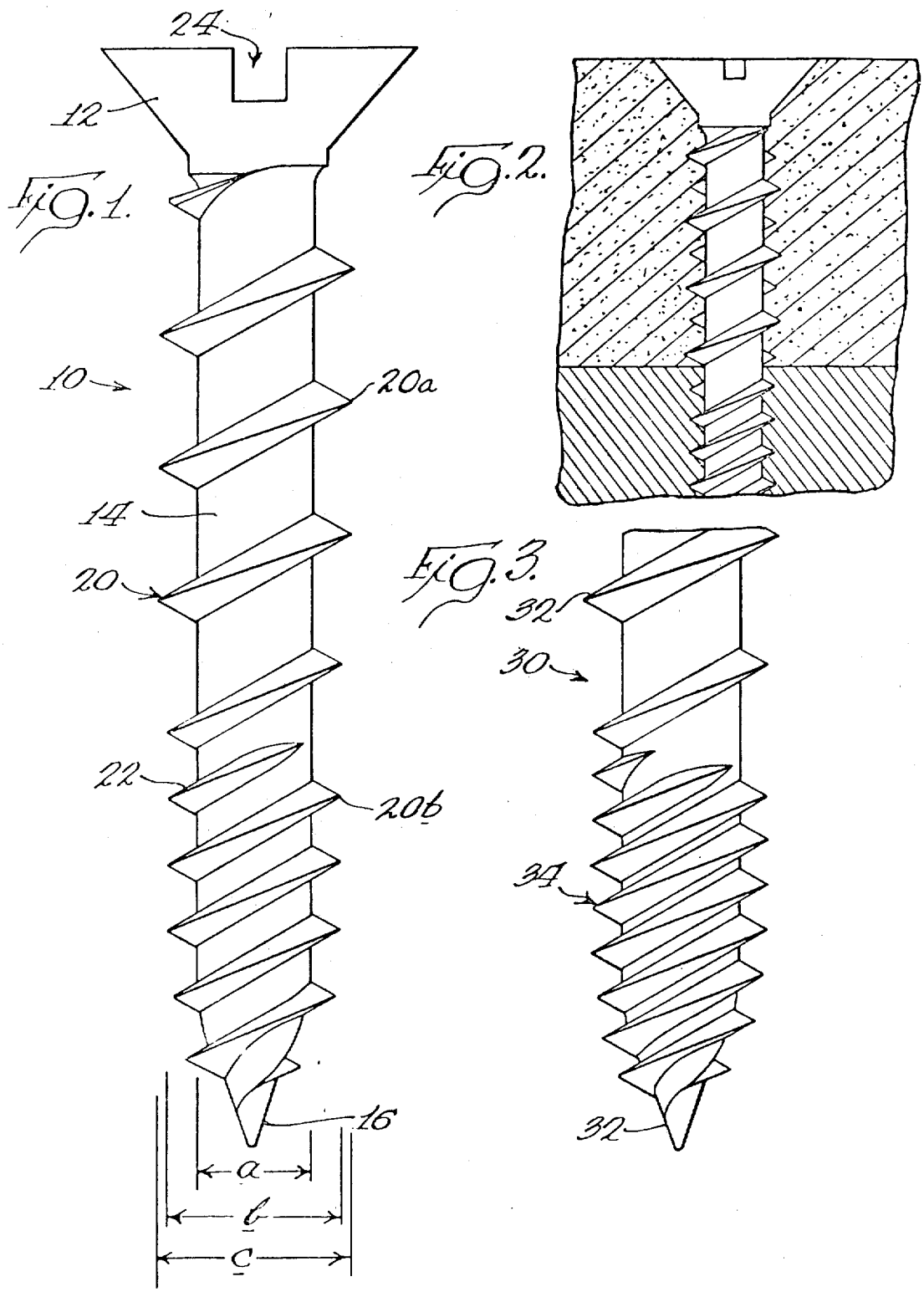

FASTENER WITH IMPROVED THREAD CONSTRUCTION

CROSS REFERENCE TO RELATED APPLICATION

This application is a continuation-in-part of my copending application, Ser. No. 103,637, filed Jan. 4, 1971; U.S. Pat. No. 3,703,843.

BACKGROUND OF THE INVENTION

The present invention relates generally to threaded fasteners and more particularly to an improved fastener for use with materials, such as particle board.

In recent years, the increased cost of natural wood, plaster and various other building materials heretofore utilized, has impelled the construction industry to look to other types of materials to reduce the cost of buildings.

Consequently the use of dry wall Gypsum board for partitions in place of plastered walls in buildings has been rather extensive. In addition, particle board, masonite, etc., are being used extensively as wall board.

While the substitute materials for the heretofore known types of building materials have found a remarkable degree of commercial success, difficulties have been encountered in providing a secure connection between the above mentioned materials and supporting structure. In various uses, the Gypsum board, particle board, masonite, etc., are secured to a supporting structure, such as a wood or metal base, by the use of self-tapping screws that form their own openings. This base was typically a wooden stud although recently thin wall aluminum channels have found wide use as studs.

Because of the tendency for the wall board materials to disintegrate under the pressure of the screw threads, difficulties have been encountered in obtaining the necessary holding power between such materials and supporting structure, such as metal.

SUMMARY OF THE INVENTION

The present invention contemplates a self-tapping screw which is capable of forming its own opening and produces easy initial entry and greater holding power after the screw has been fully inserted into the structure. The screw has a first single thread portion which impels the screw axially for rapid and easy initial entry into a workpiece such as wall board and forms threads therein.

Thereafter a second portion of the screw having multiple threads enters the workpiece, the multiple threads being formed by a continuation of the thread on the first portion and an additional thread. Both threads engage the base, such as the stud, to provide strong connection without danger of stripping thread. All of the above is accomplished by a simple and inexpensive screw which can easily be deformed by utilizing conventional roll thread dies to deform a shank of uniform or non-uniform diameter.

The above fastener element includes a shank having a head on one end and a tapered or blunt point on the opposite end and the shank is divided into first and second portions. A continuous thread of uniform pitch is produced on the shank and extends between the opposite ends. At least one additional parallel thread of similar uniform pitch is formed only on the second portion of the shank to produce multiple parallel threads along the second portion of the shank, that is a continuation of one of the multiple parallel threads. The second portion is adjacent the head in one embodiment, and is intermediate the ends in another embodiment.

In one embodiment, all of the threads on both portions of the shank have a substantially uniform minor diameter while the single continuous thread on the lower portion has the same or a larger major diameter of the upper plural threaded portion. Other embodiments have the major diameter of the additional thread smaller than that of the continuous thread throughout the length thereof, or at the entry portion thereof.

In such embodiments, the single thread on the lower portion serves to pull the screw forwardly, as it is rotated, into and through the work, the multiple threaded portion subsequently entering the work after the single thread on the lower portion has gained substantial engagement with the work, tapping a single thread in the wall board, and eventually in the stud; the additional thread then begins to tap a new female thread and passes through the wall board and into the stud or other framing members.

A still further modification of the invention has the multiple thread portion located intermediate opposite ends of the shank and the single threaded or first portion has first and second parts on opposite ends of the multiple thread or second portion. In this embodiment, the continuous thread on both portions of the shank has the same major diameter on both portions of the shank while the second parallel thread on the second portion has a smaller major diameter.

In a still further modification of the invention, the multiple threaded portion is located at the head end and the single threaded portion is located at the free end of the shank. In this embodiment, the major diameter of all of the threads is the same, while the minor diameter is smaller on the single threaded portion than it is on the multiple threaded portion. The resultant fastener element has a threaded shank of stepped configuration.

BRIEF DESCRIPTION OF SEVERAL VIEWS OF DRAWINGS

FIG. 1 is a side elevation of a fastener constructed in accordance with the invention of the said application;

FIG. 2 is a fragmentary sectional view showing the fastener of FIG. 1 retaining a workpiece on a supporting structure;

FIG. 3 is a fragmentary side elevation similar to FIG. 1 showing a slightly modified form;

DESCRIPTION OF THE PREFERRED EMBODIMENTS

Figure 4:
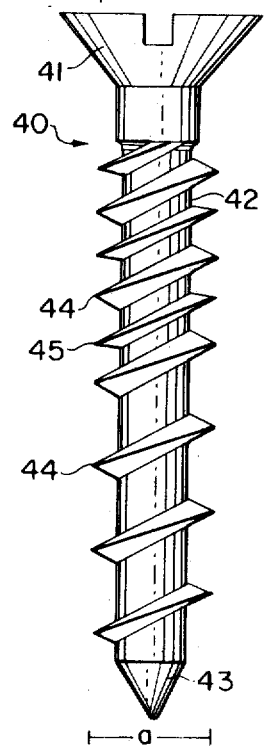
FIG. 4 is an elevational view of a fastener in accordance with the present invention, with equal major thread diameters.

While this invention is susceptible of embodiment in many different forms there is shown in the drawings and will herein be described in detail several specific embodiments, with the understanding that the present disclosure is to be considered as an exemplification of the principles of the invention and is not intended to limit the invention to the embodiments illustrated.

Referring to the drawings, FIG. 1 shows a screw 10 having an enlarged head 12 on one end of a shank 14 and a tapered point 16 adjacent the opposite end of the shank. The shank 14 is threaded and includes a continuous thread 20 extending between the head end 12, which has a kerf 24, and the tapered pointed end 16. The thread 20 has a first portion 20a on the upper end of the screw adjacent the head 12 and a second portion 20b adjacent the tapered point or opposite end of the shank. The thread portions 20a and 20b, respectively located on the first and second portions of the shank 14 have a common substantially uniform minor diameter (a) while the first or upper thread portion 20a has a greater major diameter (c) than the major diameter (b) of the second or lower thread portion 20b. Each portion of the shank has a plurality of thread convolutions as shown in FIG. 1. The second portion of the shank 14 of the screw 10 has a second parallel thread 22 that has a smaller uniform pitch and is located intermediate the continuous thread portion 20b. The two threads 20b and 22 cooperate to define parallel twin threads along the second portion of the shank and the thread portion 20a defines a single thread along the first portion of the shank that is a continuation of one of the double or twin parallel threads.

The screw 10 shown in FIGS. 1 and 2 is formed by utilizing a blank having a uniform diameter which is deformed by rolling to produce the finished screw. Since the same amount of metal is deformed along the entire length of the shank and the minor diameter of the thread is substantially uniform along the length of the shank, the major diameter of the single threaded portion is larger than the major diameter of the double or multiple threaded portion adjacent the pointed end in the specific embodiment.

When inserting the screw 10 through a workpiece, such as a particle board, Gypsum board or other wall board, and attaching the workpiece to a support, such as a metal stud, the double threaded portion provides easy entry into the material to form the hole and the double or multiple thread portion allows the screw to be inserted with a small amount of torque being applied thereto. During the travel of the double threaded portion through the workpiece, the single threaded portion enters and enlarges the major diameter of one of the multiple female threads formed in the workpiece and the multiple thread portion enters into the support to produce a multiple threaded opening in the support.

The larger major diameter of the thread on the first portion results in a deepening of one of the double threads in the workpiece to further compact the interior of the workpiece and the sbstantial increment between the major and minor diameters of the thread produces considerably greater holding power in the particle board after the screw is in its fully inserted position, shown in FIG. 2. Since only one of the double threads initially formed in the workpiece is enlarged, the higher degree of holding power in the wall board is achieved without removing or disintegrating the material between respective helixes of the upper thread.

Thus it will be seen that the FIG. 1 embodiment of the invention provides a simple and efficient construction for increasing the holding power of the screw, particularly used for connecting a workpiece to a support and therein the workpiece and the support are formed of different materials, without disintegrating the material adjacent the opening, and the double threaded portion of the lower end of the screw provides for easy, rapid screw entry.

A slightly modified form of the present invention is shown in FIG. 3, in which a shank 30 having a head (not shown) on one end thereof and a pointed tip 32 on the opposite end thereof, is provided with a single threaded portion 32 along the first portion of the screw and a triple threaded portion 34 along the second portion of the screw with one of the triple threads being a continuation of the single thread along the first portion. Again, the major diameter of the single thread along the first or upper portion of the shank is greater than the major diameter along the lower multiple thread defined on the lower portion of the shank while the minor diameters of the two threads are the same.

In the modified embodiment of the invention of FIG. 3, the threads are again produced by rolling a uniform diameter shank and the increment between the major diameters b and c, is larger than the increment between the diameters in the FIG. 1 embodiment.

Referring now to FIG. 4, there is shown a headed screw fastener 40 having a head 41 axially of a shank 42, the shank having a pointed end 43 axially thereof and opposite the head, there being a first portion of the shank 42 adjacent the pointed end 43 having a single thread 44, which single thread 44 continues upwardly and onto the second portion of the shank 42, adjacent the head 41, there also being on the second portion an addtional thread 45 which is intermediate the convolutions of the thread 44, and which additional thread 45 is only on the second portion of the shank 42. As indicated by the reference character a the major diameter of the continuous thread 44 is substantially constant throughout its length, and the major diameter of the additional thread 45 has the same value as that of the continuous thread 44. In this embodiment, the screw 40 will penetrate into and form a hole in the workpiece, such as a wall board, and the rotation of the screw 40, together with the engagement of the continuous thread 44 will cause the screw 40 to be advanced into and through the workpiece, with eventual penetration into the stud or other framing member, such as a thin aluminum channel wall, the additonal thread 45 forming an addtional female thread first in the workpiece, and then as the screw 40 advances still further, the parts of the continuous thread 44 on the upper or second portion of the shank 42 will follow in the same female thread which has been formed by the portion of the continuous thread 44 which has already passed through the workpiece. During this continued advance of the screw 40, the additional thread 45 will pass through the workpiece, and will enter into the base, or stud, or other frame member, and form a hole with a dobule thread therein, thereby to provide ease of entry, and superior holding power, without danger of stripping. As will be understood, these screws are conventionally driven by power operated tools, which are equipped with an over-ride clutch, which releases when a predetermined resistance is met in the driving of the screw, and thus when the head 41 is seated and both of the threads are in both the wall board and the stud, this clutch will release, and the screw will not strip, but will remain seated and secure, thereby securely holding the wall board to the stud.

Figure 5:
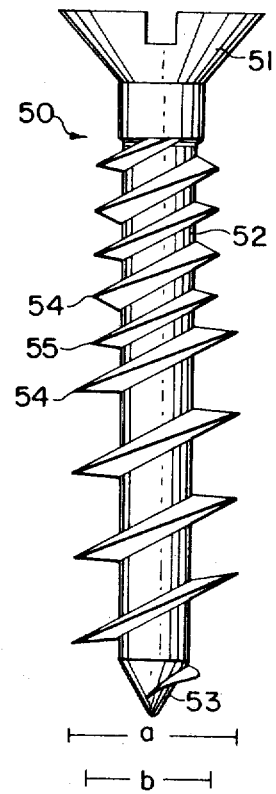
FIG. 5 is an elevational view of another fastener, with upper portion threads having a smaller major diameter.

Referring now to FIG. 5, there is shown an embodiment of the invention including a screw 50 having a head 51, a shank 52 and a pointed end 53 opposite head 51. A continuous thread 54 is on the first portion of the shank 52, adjacent the point 53, and continues onto a second portion of shank 52, adjacent the head 51. An additional thread 55 is only on the second portion of the shank 52, between the convolutions of the continuous thread 54 and it will be understood that in this embodiment, as in the others herein disclosed, the pitch of the continuous thread is uniform, and the pitch of the additional thread is uniform and of the same value as that of the continuous thread. In this embodiment, the continuous thread on the first portion has a major diameter indicated by the reference $a$, while the continuous thread 54 on the second portion and the additional thread 55 on the second portion have equal major diameters, indicated by the reference $b$, which is less than the major diameter indicated by the reference $a$.

Figure 6:
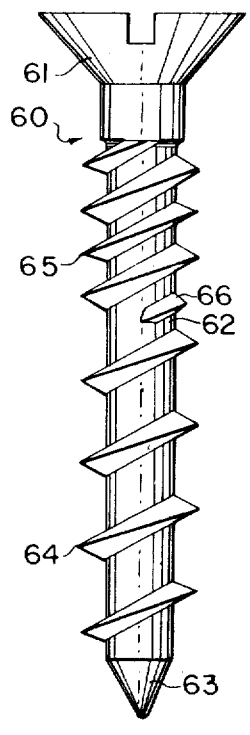
FIG. 6 is an elevational view of a further fastener in which the additional thread leading portion is of smaller major diameter.

In FIG. 6, there is shown a further embodiment of the invention, the screw 60 shown therein having the head 61 and shank 62, with a point 63 at the end opposite head 61. On the first portion adjacent the point 63 is a continuous thread 64 of uniform pitch, which extends onto the second portion adjacent the head 61, there being located on the second portion also an additonal thread 65, both threads having uniform and equal pitch throughout, but with the initial or leading portion 66 of the additional thread 65 having a major diameter which is less than the major diameter of the continuous thread 64; the remaining portion of the addtional thread 65 has a major diameter which is substantially equal to the major diameter of the continuous thread 64. This embodiment provides for somewhat easier entry of the addtional thread 65, it being contemplated that the leading portion 66 may either penetrate completely through the stud or bracing member, or may lodge therein. In either event, depending upon the dimensions of the screw 60 and the parts thereof, and the workpieces, the additional thread 65 will have at least some portion thereof engaging both the stud or other framing and the wall board.

Figure 7:
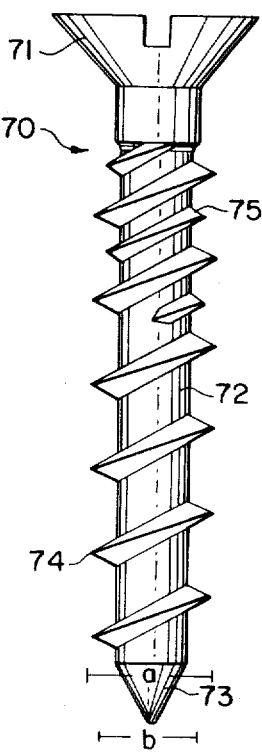
FIG. 7 is an elevational view of an embodiment in which the additional thread has a smaller major diameter.

In FIG. 7, there is shown a screw 70 having a head 71, a shank 72 and a pointed end 73 opposite the head 71, with the continuous thread 74 on the first portion adjacent the point 73 and continuing onto the second portion adjacent the head 71. There is also provided an additional thread 75, only on the second portion of the shank 72, the additional thread 75 having a major diameter indicated by the reference $b$ which is less than the major diameter of the continuous thread 74, represented by the reference $a$. In this embodiment, the axial movement of the screw 70 is initially caused by the continuous thread 74 located on the first portion, and then the additional holding is achieved by the additional thread 75 located only on the second portion, but since the additional thread 75 has a lesser major diameter than the continuous thread 74, the complete passage of the screw 70 will be relatively easy, while it will provide secure holding power, and have little if any tendency to strip out.

Figure 8:
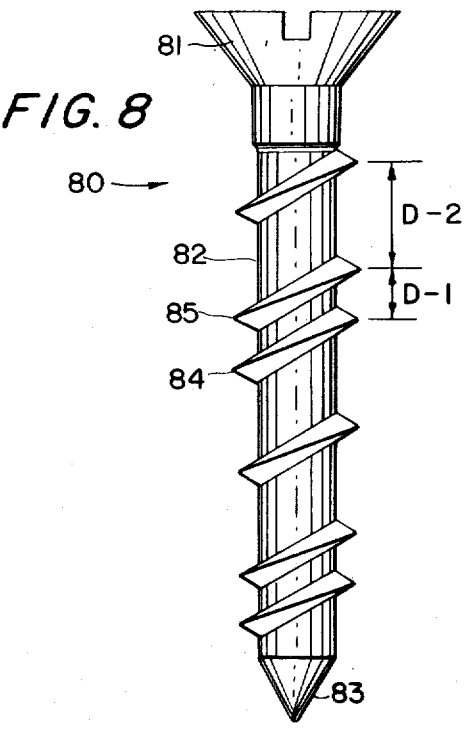
FIG. 8 is an elevational view of a fastener similar to FIG. 4, but with unequal thread spacing.

In FIG. 8, there is shown an embodiment of the invention in which the screw 80 has the head 81, shank 82 and point 83, with a continuous thread 84 on both portions, and the additional thread 85 on the second portion, adjacent the head 81. This embodiment of the invention is distinguished by the fact that while the additional thread 85 has its convolutions intermediate the convolutions of the continuous thread 84 which are on the second portion, the spacing between the threads is unequal, this being indicated by the relatively small spacing D-1 between one convolution of the additional thread 85 and the adjacent convolution of the continuous thread 84 therebelow, and the distance D-2 between that convolution of the additional thread 85 and the convolution of the continuous thread 84 which is immediately thereabove. This embodiment would provide somewhat greater insurance that where the stud or other workpiece which is the second to be entered by the screw is of very thin wall construction, the additional thread would enter it and provide secure engagement therewith.

Figure 9:
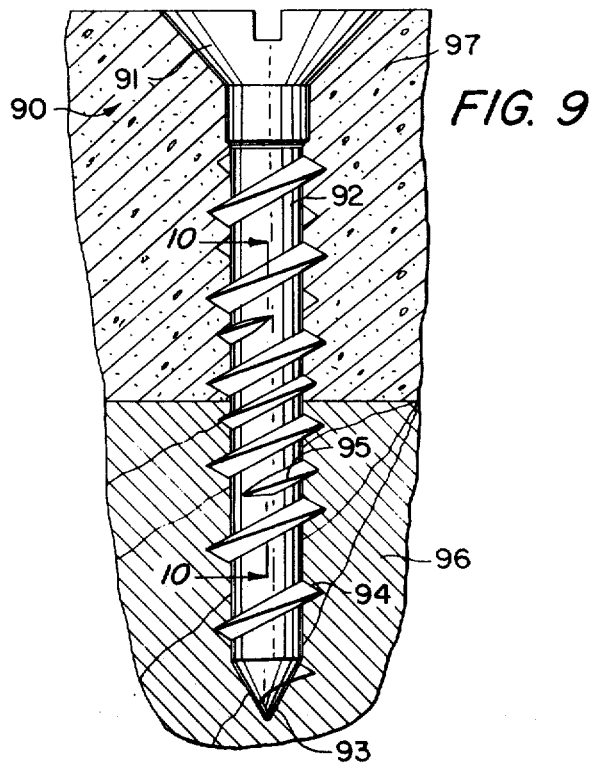
FIG. 9 is a view similar to FIG. 2, showing a still further modified form of fastener.
Figure 10:
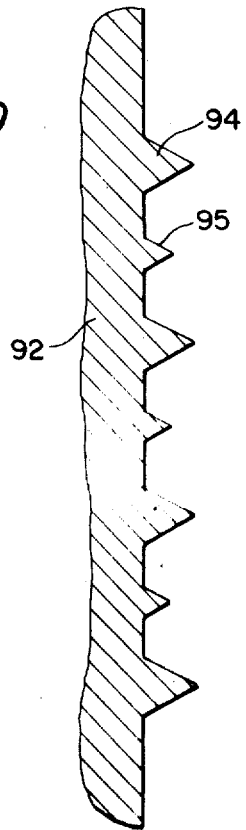
FIG. 10 is an enlarged fragmentary cross section taken on the line 10—10 of the fastener shown in FIG. 9.

A still further embodiment of the invention is shown in FIGS. 9 and 10, wherein the screw 90 is shown having a head 91 axially of a shank 92 and a point 93 axially of the shank opposite the head 91, and a continuous thread 94 extending from the point 93 to the head 91, as in the previous embodiments. In this embodiment, the second portion of the shank 92 is located intermediate the point 93 and the head 91, and it is on this second portion that there is located the additional thread 95. The first portion, having only the continuous thread 94 will be seen to be in two parts, one located near the point 93, and the other part being located near the head 91. The continuous thread 94 that extends on both portions of the shank 92 has a uniform major diameter, while as best shown in FIG. 9, the major diameter of the additional thread 95 is smaller. The continuous thread 94 having the larger major diameter, produces substantial holding power in both the stud 96 and the wall board 97 (see FIG. 9) while the additional or auxiliary thread 95 on the second portion of the shank 92 has a substantial portion thereof located in both the stud 96 and the wall board 97, providing additional holding power in the stud 96.

In the embodiment illustrated in FIGS. 9 and 10 the threads can be produced by rolling a shank having an enlarged diameter along the second portion to produce the continuous thread having a common major diameter and the second parallel thread having a smaller major diameter. Alternatively, screw 90 could be produced by rolling a uniform diameter shank to produce the thread configuration illustrated. In the alternate version of forming the screw, the included angle between the opposed walls of the continuous thread 94 in the second portion of the shank would be somewhat less than the included angle between the walls of the thread in the first portion of the shank.

It will be appreciated that the additional or auxiliary thread 95 could be formed to have a major diameter equal to the major diameter of the continuous thread 94.

Figure 11:
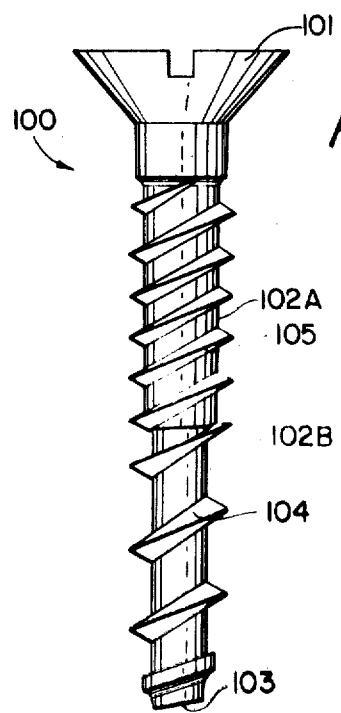
FIG. 11 shows another modified form of fastener, with stepped shank.

A still further embodiment of the invention is shown in FIG. 11. The screw 100 shown in FIG. 11 is what is referred to as a Type B USA STandard, which has a blunt point 103 at the free end opposite head 101 axially between which is an upper shank portion 102A, and a lower shank portion 102B of smaller diameter.

A continuous thread 104 extends on both portions of the shank and an additional parallel thread 105, which has a pitch which is similar to the pitch of thread 104, is located intermediate the convolutions of the continuous thread 104 in the second portion 102A only.

In the embodiment illustrated in FIG. 11, the thread of the first portion 102B of the shank has a minor diameter that is smaller than the minor diameter of the threads on the second portion 102A of the shank, while the major diameters of all of the threads of both portions are the same. The resultant screw may be termed a screw of stepped configuration since the minor diameter increases in the second or double thread portion of the shank.

The screw in FIG. 11 would be utilized in a fashion similar to the one described in connection with FIG. 4 in that the second or double threaded portion 102A would be located in both the support and the workpiece while the first portion 102B would be located entirely in the support. This screw has particular utility in connecting a metal workpiece to a metal support, both of which have preformed holes.

In the embodiments of the invention shown in FIGS. 4 through 11, the second, auxiliary or additional thread commences at a location spaced from the free end of the shank and has a plurality of thread convolutions. In these embodiments, the auxiliary thread is positioned on the shank so that at least a part of the auxiliary thread will engage the support when the screw is in its final position holding a workpiece on a support.

It will be appreciated that numerous modifications will come to mind without departing from the spirit of the invention. For example, any multiple of threads could be used for the second portion of any of the screws shown and described above so long as one of the threads in the second portion of the shank continues into the first portion of the shank.

In addition, the tapered point screws described in connection with FIGS. 1 through 10 could all be formed with a blunt free end and the screws shown in FIG. 11 could have a tapered point. Likewise, the minor diameters on the different portions of the shank could be different from any of the screws described and the second thread, running parallel to the continuous thread, could have a larger or smaller major diameter than the major diameter of the thread in the first portion of the shank. In addition, the threads need not have the standard 60°include angle, such as the USA Standard Type A and Type B. The threads could also be a straight buttress thread or a reverse buttress.

The head on any of the screws shown could be of the flat type, such as shown, or an oval head, round head, pan head or Fillister head could be substituted without departing from the spirit of the invention.

As was indicated above, the point of any of the screws described above need not be a tapered point, and it the screw is to be utilized in connection with the preformed holes in the workpiece and support, the continuous thread could start at a point spaced from the end rather than directly on the end of the screw.

In addition, any of the screws shown could have more than one additional, auxiliary parallel thread formed in the second portion of the shank. For example, all screws could have two auxiliary threads formed in the second portion of the screw, similar to the embodiment of FIG. 3.

It will be obvious to those skilled in the art that various changes may be made without departing from the spirit of the invention and therefore the invention is not limited to what is shown in the drawings and described in the specification but only as indicated in the appended claims.

I claim:

1. A fastening element including a shank, a head axially of one end of said shank, and a tapered point axially of the opposite end of said shank, said shank being divided into a first portion located adjacent said point and a second portion located adjacent said head; a continuous thread of uniform pitch on said shank extending substantially over the entire length of said shank with at least one of said portions having a plurality of thread convolutions; and at least one additional parallel thread of similar uniform pitch intermediate said continuous thread only on said second portion of said shank.

2. The fastening element of claim 1, wherein the major diameter of said continuous thread is substantially constant substantially throughout the length of said shank.

3. The fastening element of claim 2, said additional thread having a major diameter equal to that of said continuous thread substantially throughout the length thereof.

4. The fastening element of claim 2, said additional thread having a major diameter at the portion thereof closest said point of a lesser diameter than the major diameter of said continuous thread, the remaining portion of said additional thread having a major diameter substantially equal to the major diameter of said continuous thread.

5. The fastening element of claim 2, said additional thread having a major diameter substantially throughout its length of a lesser diameter than the major diameter of said continuous thread.

6. The fastening element of claim 1, said continuous thread having a major diameter on said first portion which is greater than the major diameter of the threads on said second portion.

7. The fastening element of claim 1, said threads having a common minor diameter throughout the length of both portions.

8. The fastening element of claim 1, wherein the axial spacing between said threads is unequal.

9. A fastening element including a shank with a head axially of one end thereof and a tapered point axially of the opposite end thereof, said shank being divided into a first portion having a part thereof adjacent said head and another part thereof adjacent said point, with a second portion intermediate said parts of said first portion; a continuous thread of uniform pitch on said shank extending substantially between said ends with said portions each having a plurality of thread convolutions; and at least one additional parallel thread of similar uniform pitch intermediate said continuous thread only on said second portion of said shank.

10. The fastening element of claim 9, the major diameter of said additional thread being less than the major diameter of said continuous thread.

11. A fastening element including a shank with a head axially of one end thereof and a blunt end axially thereof opposite said head, said shank being divided into a first portion adjacent said blunt end and second portion adjacent said head; a continuous thread of uniform pitch on said shank extending substantially between said ends with said portions each having a plurality of thread convolutions; and at least one additional parallel thread of similar uniform pitch intermediate said continuous thread only on said second portion of said shank.

12. A fastening element as set forth in claim 11, said threads on said second portion having a uniform minor diameter and said thread on said first portion having a minor diameter less than the threads on said second portion.

13. The fastening element of claim 1, wherein said second portion has a plurality of thread convolutions of said continuous thread.

14. The fastener of claim 13, said continuous thread extending onto said point.

15. The fastener of claim 1, said continuous thread extending onto said point.

16. The fastener of claim 1, wherein both portions have a plurality of thread convolutions of said continuous thread.

17. The fastener of claim 16, said continuous thread extending onto said point.

* * * * *